United States Patent [19]
Fairchild

[11] 3,918,208
[45] Nov. 11, 1975

[54] COUPLING DEVICE

[76] Inventor: Willis A. Fairchild, 273 West Broadway, Shelbyville, Ind. 46176

[22] Filed: Apr. 26, 1974

[21] Appl. No.: 464,996

[52] U.S. Cl.................... 151/5; 85/3 R; 85/5 CP
[51] Int. Cl.²..................... F16B 21/00; F16B 39/02
[58] Field of Search............ 85/5 CP, 5 N, 5 M, 8.1, 85/3 R, 3 S, 3 K; 151/5, 6, 38

[56] References Cited
UNITED STATES PATENTS

| | | | |
|---|---|---|---|
| 501,052 | 7/1893 | Brown | 151/38 |
| 1,433,410 | 10/1922 | Passauer | 85/3 R X |
| 1,974,966 | 9/1934 | McClure | 85/5 CP X |
| 2,201,930 | 5/1940 | Stark | 151/38 |
| 2,246,834 | 6/1941 | Bowman | 85/3 S |
| 2,661,970 | 12/1953 | Petersen | 85/3 R X |
| 3,487,744 | 1/1970 | Montana | 85/3 R |

*Primary Examiner*—Ramon S. Britts

[57] ABSTRACT

A coupling device which may be used to connect tractors or other vehicles to farm implements, trailers, or the like, has a shaft with a head at one end and is threaded adjacent its other end. A washer is carried by the shaft, the head and the washer being on opposite sides of the tongue or other connecting means. A spring is carried by the shaft between the washer and a threaded fastener which fits onto the shaft. A locking pin is provided to secure the fastener in desired positions.

1 Claim, 4 Drawing Figures

U.S. Patent  Nov. 11, 1975  3,918,208
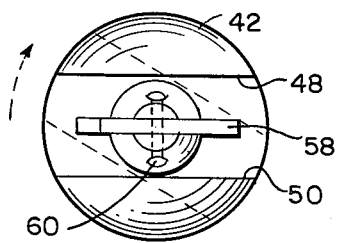
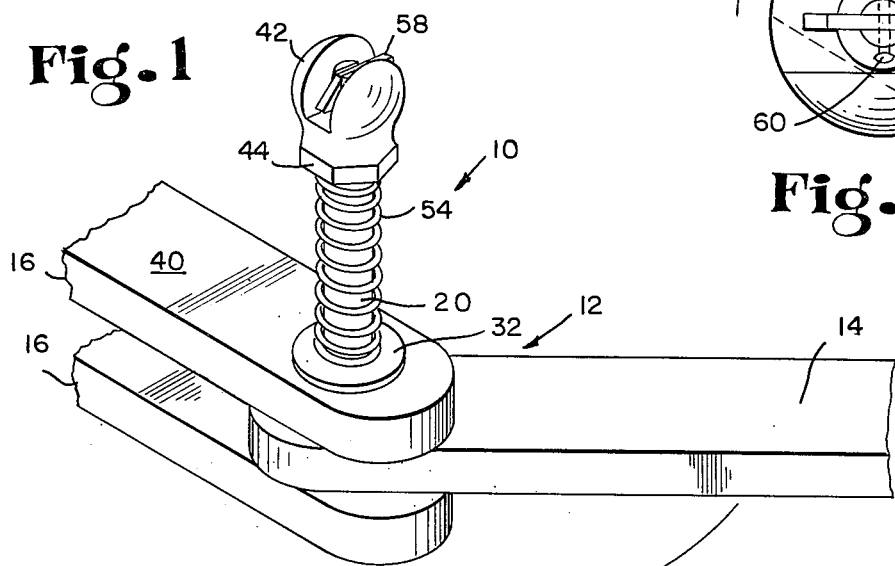
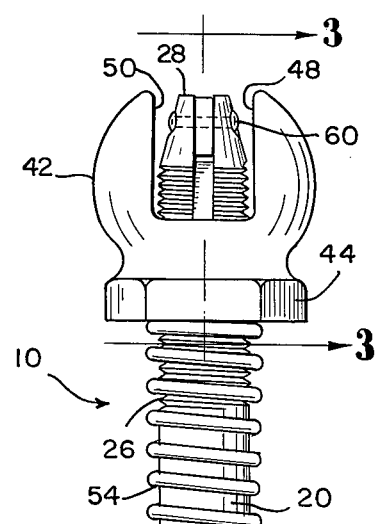
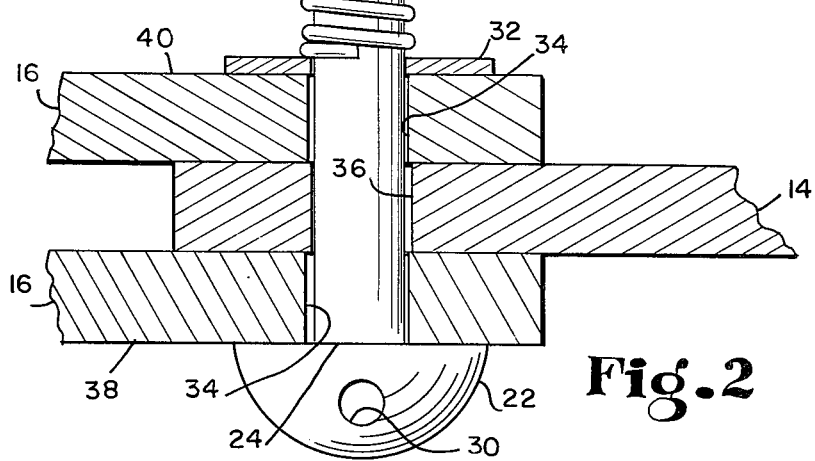

COUPLING DEVICE

BACKGROUND OF THE INVENTION

This invention relates to a coupling device, and more particularly to a coupling device used to connect motorized vehicles to farm implements, trailers, etc.

Coupling devices or hitch pins are widely used in connecting tractors and various farm implements. A draw bar on a tractor may fit into a tongue member attached to the farm implement, and a hitch pin passes through aligned holes in both. Such hitch pins normally comprise an extended shaft with some type of ring or head at its upper end. The pin is lowered through the aligned holes and connection is accomplished. Various means have been used to help retain the pin in position. Sometimes a cotter pin is inserted through an opening in the lower portion of the shaft. In another device, a spring wire is attached to the pin head and passes around the tongue and draw bar and is then attached to the lower portion of the shaft. Examples of hitch pins and coupling means of various types may be found in U.S. Pat. Nos. 1,422,189; 2,292,751; 2,367,874; 2,446,223; 2,478,738; 2,482,907; 3,046,037; and 3,762,748.

Although coupling devices are widely used, many are ill-suited for use with farm implements. Some of the more elaborate devices extend upwardly so far that they interfere with the power take-off of a tractor. And the pin shaft usually extends several inches beneath the tongue or other connecting means. In pulling trailers or farm implements, particularly over rough terrain, or where rocks, tree stumps, or other objects are encountered, the protruding pin shafts are often bent, broken or dislodged when they strike such objects. Locking means, such as cotter pins or spring wire may easily be knocked out of place and the pin may then be dislodged by such objects. Not only are such pins often destroyed or damaged beyond use, but they are sometimes dislodged causing an uncoupling of the vehicle and implement. The pins may also drag along objects and debris such as loose hay, corn stalks and other crops.

SUMMARY OF THE INVENTION

This invention provides a coupling device which is free of those shortcomings. The device utilizes a pin having a shaft which extends above the connecting means, with only a head protruding slightly below. A spring carried by the shaft between a fastener and a washer causes the head to fit snugly against the lower face of the connecting means. A locking pin prevents the fastener from being moved, except when desired. While one size coupling device may well fit most uses, devices may be made in differing sizes for different uses. This coupling device is not subject to breaking or dislodgement by striking objects on the ground, is universally adaptable, and is safe.

BRIEF DESCRIPTION OF THE DRAWINGS

The accompanying drawings illustrate the invention. In such drawings:

FIG. 1 is a perspective view of a coupling device of this invention interconnecting a draw bar and tongue type connecting means;

FIG. 2 is a view, partly in section, of the coupling device and connecting means shown in FIG. 1;

FIG. 3 is a sectional view along the line 3—3 of FIG. 2; and

FIG. 4 is a top elevational view of the coupling device.

DETAILED DESCRIPTION OF THE PREFERRED EMBODIMENT

A coupling device 10 is used to interconnect connecting means 12, such as a tractor draw bar 14 and a tongue 16 of a farm implement or trailer. The coupling device 10 comprises a pin having a shaft 20 with a generally rounded or hemispherical-shaped head 22 at its lower end 24 and a threaded portion 26 adjacent to its upper end 28. The head 22 has an opening 30 therethrough adapted to receive a screwdriver or other tool when it is desired to prevent the head and shaft from moving.

A washer 32 is carried by the shaft 20 between the head 22 and the upper end 28 of the shaft. The shaft 20 may be of such size and shape as may be necessary to interconnect the connecting means with which it is to be used. As illustrated in FIG. 2, the shaft 20 is adapted to fit through aligned openings 34 and 36 in the tongue 16 and draw bar 14, respectively. When in position, the head 22 is in contact with the lower face 38 of the tongue 16, and the washer 32 is in contact with the upper face 40 of the tongue 16.

Fastening means, such as a nut 42 is threadedly engageable with the threaded portion 26 of the shaft 20. The nut 42 has generally smooth, rounded outer surfaces. Exposed sharp points are avoided. Flat surfaces 44 are provided at the lower portion of the nut 42 to permit the nut to be turned by a wrench or other tool. Although the nut 42 may ordinarily be easily threaded onto and off of the threaded portion 26 without the use of tools, extra force may be applied when needed as by gripping flat surfaces 44 with a wrench and inserting one end of a screwdriver or other object in the opening 30 to prevent the shaft 20 from turning. An open space is provided in the upper portion of the nut 44 between inner walls 48 and 50.

A flexible tension spring 54 is carried by the shaft 20 between the washer 32 and the nut 42. The size and rigidity of the spring 54 may vary depending upon the particular use of the coupling means and is related to the thickness of the connecting means. The spring 54 and nut 42 should permit the nut to be securely attached to the shaft 20 while holding the head 22 firmly against the lower face 38 of the connecting means.

A locking pin 58 is connected with the shaft 20 adjacent to its upper end 28, as by a pivot pin 60. When the nut 42 is engaged with the threaded shaft portion 26 and the locking pin 58 is in a horizontal position, as illustrated in the drawings, the nut 42 can be turned only slightly until the pin 54 comes into contact with the walls 48 and 50 of the nut 42, as is illustrated in dotted lines in FIG. 4. The pin 54 thus serves to secure the nut 42 in desired positions. This provides an additional safety feature to prevent accidental unlocking or dislodgement of the coupling means. To remove or loosen or tighten the nut 42, the locking pin 58 is moved to a vertical position, as illustrated in dotted lines in FIG. 3.

The coupling device protrudes beneath the connecting means 12 only by the thickness or radius of the head 22. Thus when used to connect a tractor and farm implement, for example, there is virtually no danger of the head 22 striking objects on the ground. And if the head 22 does strike an object, its rounded surface aids it in passing over the object without breaking the pin or causing it to become unlocked. The length of the shaft 20 should not be so great as to interfere with the power take-off of a tractor or other vehicle.

This coupling device may be economically manufactured, readily assembled to interconnect connecting means, and readily disassembled. Once in place, the nut 42 and locking pin 58 serve as double safety means retaining the device in position. There is virtually no likelihood of the device being broken or dislodged in use, as is so often the case with prior devices.

I claim:

1. A device for coupling connecting means comprising a pin having a shaft with a head at its lower end and a threaded portion adjacent its upper end, a washer slidably carried by said shaft between said head and said upper end, said shaft being adapted to fit through aligned openings in the connecting means with said head in contact with the lower face and said washer in contact with the upper face of the connecting means, a nut threadably engageable with said threaded portion of said shaft and being removable therefrom, a coil spring slidably carried by said shaft between said washer and said nut with one end of said spring abutting said washer and the other end thereof abutting said nut, and a locking pin pivotably connected with the threaded portion of said shaft adjacent to its upper end, said locking pin having a first dimension which is greater than the maximum diameter of said threaded portion and a second dimension which is less than said diameter, said locking pin being pivotally mounted substantially midway between said two dimensions, said locking pin being pivotal between a first position wherein said greater dimension is axially aligned with the axis of said shaft and a second position wherein said greater dimension is perpendicular to said axis, said locking pin and said nut being adapted to be inter-engageable to secure said nut in desired positions, said nut having inner walls forming an open space in its upper portion to receive said locking pin therein in contact with said inner walls when said locking pin is in said second position.

* * * * *